US008014361B2

(12) United States Patent
Ozluturk

(10) Patent No.: US 8,014,361 B2
(45) Date of Patent: Sep. 6, 2011

(54) RANDOM ACCESS CHANNEL FOR OFDM-MIMO SYSTEM

(75) Inventor: Fatih M. Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 764 days.

(21) Appl. No.: 11/746,363

(22) Filed: May 9, 2007

(65) Prior Publication Data

US 2007/0263579 A1 Nov. 15, 2007

Related U.S. Application Data

(60) Provisional application No. 60/798,970, filed on May 9, 2006.

(51) Int. Cl.
*H04B 7/216* (2006.01)

(52) U.S. Cl. ....... 370/335; 455/502; 455/515; 455/63.1; 455/60; 455/45; 455/450; 455/452.1; 455/452.2; 455/456.2; 455/456.5; 455/435.1; 455/550.1; 455/561; 370/64; 370/480; 370/344; 370/235; 370/436; 370/329; 370/330; 370/395.21; 370/208; 370/343

(58) Field of Classification Search .................. 455/411, 455/410, 435.1, 414.1, 502, 515, 63.1, 60, 455/45, 450, 452.1, 452.2, 456.2, 456.5, 455/522, 500, 464, 550.1, 561, 259, 249; 713/183, 171, 168, 155, 160, 185; 370/64, 370/480, 335, 344, 235, 436, 329, 330, 395.21, 370/208, 342
See application file for complete search history.

(56) References Cited

U.S. PATENT DOCUMENTS

| 7,539,263 | B2* | 5/2009 | Jung et al. | 375/267 |
|---|---|---|---|---|
| 2004/0001429 | A1* | 1/2004 | Ma et al. | 370/210 |
| 2004/0081131 | A1* | 4/2004 | Walton et al. | 370/344 |
| 2005/0002325 | A1* | 1/2005 | Giannakis et al. | 370/208 |
| 2005/0084030 | A1* | 4/2005 | Zhou et al. | 375/267 |

(Continued)

FOREIGN PATENT DOCUMENTS

WO 00/22873 4/2000

OTHER PUBLICATIONS

3GPP, "3rd Generation Partnership Project; Technical Specification Group Radio Access Network; Physical Layer Aspects for Evolved UTRA (Release 7)", 3GPP TR25.814 V0.1.1 (Jun. 2005).

(Continued)

*Primary Examiner* — Kwasi Karikari
(74) *Attorney, Agent, or Firm* — Volpe and Koenig, P.C.

(57) ABSTRACT

In orthogonal frequency division multiplexing (OFDM) multiple-input multiple-output (MIMO) systems, a wireless transmit/receive unit (WTRU) selects a random access channel (RACH) and a phase for a constant amplitude zero auto correlation (CAZAC) sequence for RACH transmission. The WTRU then transmits a RACH transmission to a Node B via the selected RACH. Once the RACH transmission is detected, the Node B sends an acknowledgement (ACK) to the WTRU over an ACK channel. The Node B may transmit the ACK on a shared channel. The WTRU may ramp up transmit power while the RACH transmission is transmitted, or steps up transmit power of a subsequent RACH transmission. The RACH transmission and data transmission may be either time multiplexed or frequency multiplexed. A plurality of RACHs may be defined and one of the defined RACHs may be selected randomly or based on predetermined criteria.

28 Claims, 7 Drawing Sheets

U.S. PATENT DOCUMENTS

| | | | | |
|---|---|---|---|---|
| 2006/0073834 A1* | 4/2006 | Thorson | | 455/450 |
| 2007/0165567 A1* | 7/2007 | Tan et al. | | 370/329 |
| 2007/0165857 A1* | 7/2007 | Das et al. | | 380/237 |
| 2007/0183371 A1* | 8/2007 | McCoy | | 370/334 |
| 2008/0123616 A1* | 5/2008 | Lee | | 370/344 |

OTHER PUBLICATIONS

Branislav M. Popović, "Generalized Chirp-Like Polyphase Sequences With Optimal Correlation Properties", IEEE Transactions on Information Theory, vol. 38, No. 4, pp. 1406-1409, (Jul. 1992).

Fan et al., "Generalized Orthogonal Sequences and Their Applications in Synchronous CDMA Systems", IEICE Trans. Fundamentals, vol. E83-A, No. 11, pp. 2054-2069, (Nov. 2000).

Huawei, "RACH Design for E-UTRA", 3GPP TSG RAN WGI Meeting #44bis, R1-060797, (Athens, Greece Mar. 2006).

Masson, "E-UTRA RACH within the LTE System," XR-EE-KT 2006:002 (Feb. 3, 2006).

Motorola, "Preamble Sequence Design for Random Access of E-UTRA", 3GPP TSG RAN1#45, R1-061168, (Shanghai, China May 2006).

Motorola, "Random Access Sequence Design", 3GPP TSG RAN1#44-bis, R1-060884, (Athens, Greece Mar. 2006).

Motorola, "RACH Design for EUTRA," 3GPP TSG RAN 1 #44, R1-060387 (Feb. 13-16, 2006).

Nortel Networks, "Consideration on Issues of LTE RACH", 3GPP RAN1 Meeting #44-bis, R1-060909, (Athens, Greece Mar. 2006).

Panasonic, "Random Access Designs for E-UTRA Uplink", TSG-RAN WG1 Meeting#45, R1-061114, (Shanghai, China May 2006).

* cited by examiner

RANDOM ACCESS CHANNEL FOR OFDM-MIMO SYSTEM

CROSS REFERENCE TO RELATED APPLICATION

This application claims the benefit of U.S. Provisional Application No.: 60/798,970 filed May 9, 2006, which is incorporated by reference as if fully set forth.

FIELD OF INVENTION

The present invention relates to wireless communications. More particularly, the present invention relates to a random access channel (RACH) in orthogonal frequency division multiplexing (OFDM) multiple-input multiple-output (MIMO) systems.

BACKGROUND

In a wireless communication system, a RACH is used by a user terminal to establish a link with a base station for data transmission. The access via the RACH should not create undue interference on other communication links in a cell and should allow differentiation for a large group of users. The channel that the user terminal uses to establish the initial link with the base station is an RACH. The design of an RACH should meet such requirements as allowing the base station to detect access attempts easily, allow enough capacity for a large number of terminals to access the base station without undue congestion, and allow differentiation for groups of users since it is desirable for the base station to differentiate access attempts.

SUMMARY

The present invention relates to an RACH in OFDM MIMO systems. A wireless transmit/receive unit (WTRU) selects an RACH and a phase for a constant amplitude zero auto correlation (CAZAC) sequence for RACH transmission. The WTRU then transmits a RACH transmission to a Node B via the selected RACH. Once the RACH transmission is detected, the Node B sends an acknowledgement (ACK) to the WTRU over an ACK channel. The Node B may transmit the ACK on a shared channel. The WTRU may ramp up transmit power while the RACH transmission is transmitted, or steps up transmit power of a subsequent RACH transmission. The RACH transmission and data transmission may be either time multiplexed or frequency multiplexed. A plurality of RACHs may be defined and one of the defined RACHs may be selected randomly or based on predetermined criteria. The RACH transmission may be transmitted using one of space-frequency block coding (SFBC), space time block coding (STBC), and beam forming.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment.

Figure 1:
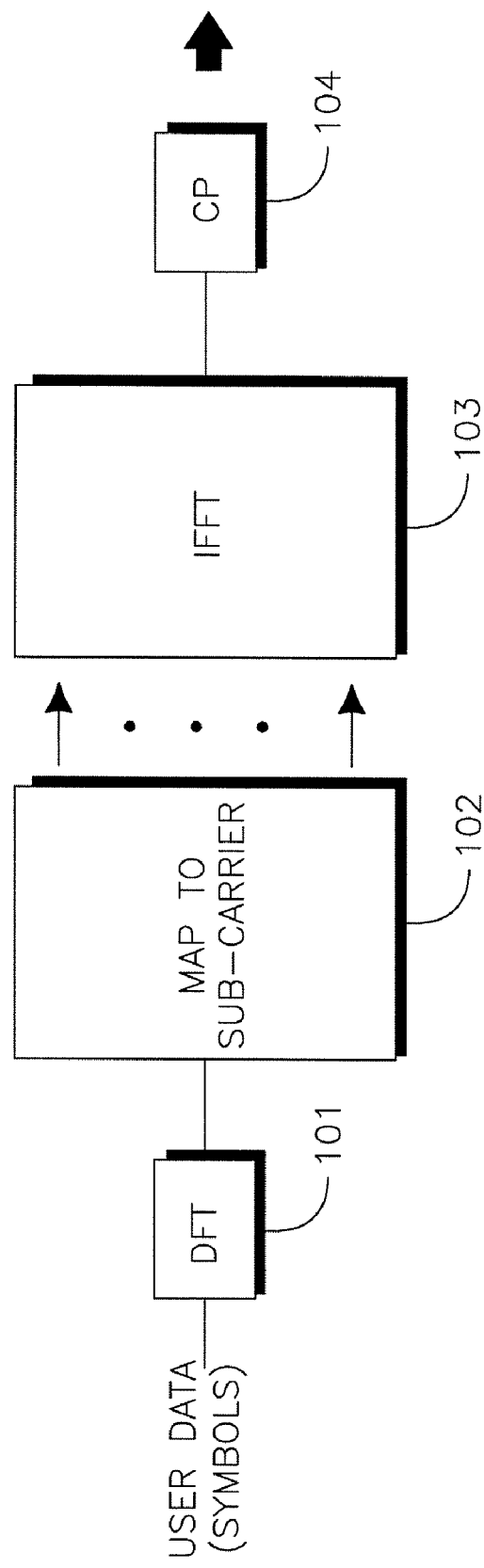
FIG. 1 shows a schematic flow of uplink data transmission in an OFDM system.

FIG. 1 shows a schematic flow of uplink data transmission in an OFDM system. A discrete Fourier transform (DFT), (equivalently, fast Fourier transform (FFT)), is performed on user data symbols to be transmitted by a DFT unit 101, (or FFT unit). The resulting data after DFT processing is mapped to a group of sub-carriers by a mapping unit 102. The sub-carrier mapping may be either localized sub-carrier mapping or a distributed sub-carrier mapping. Next, an inverse fast Fourier transform (IFFT), (equivalently inverse DFT), is performed by an IFFT unit 103 (or inverse DFT unit) on the sub-carrier mapped data. A cyclic prefix (CP) is then attached by a CP unit 104 before transmission of the sub-carrier mapped data.

Figure 7:
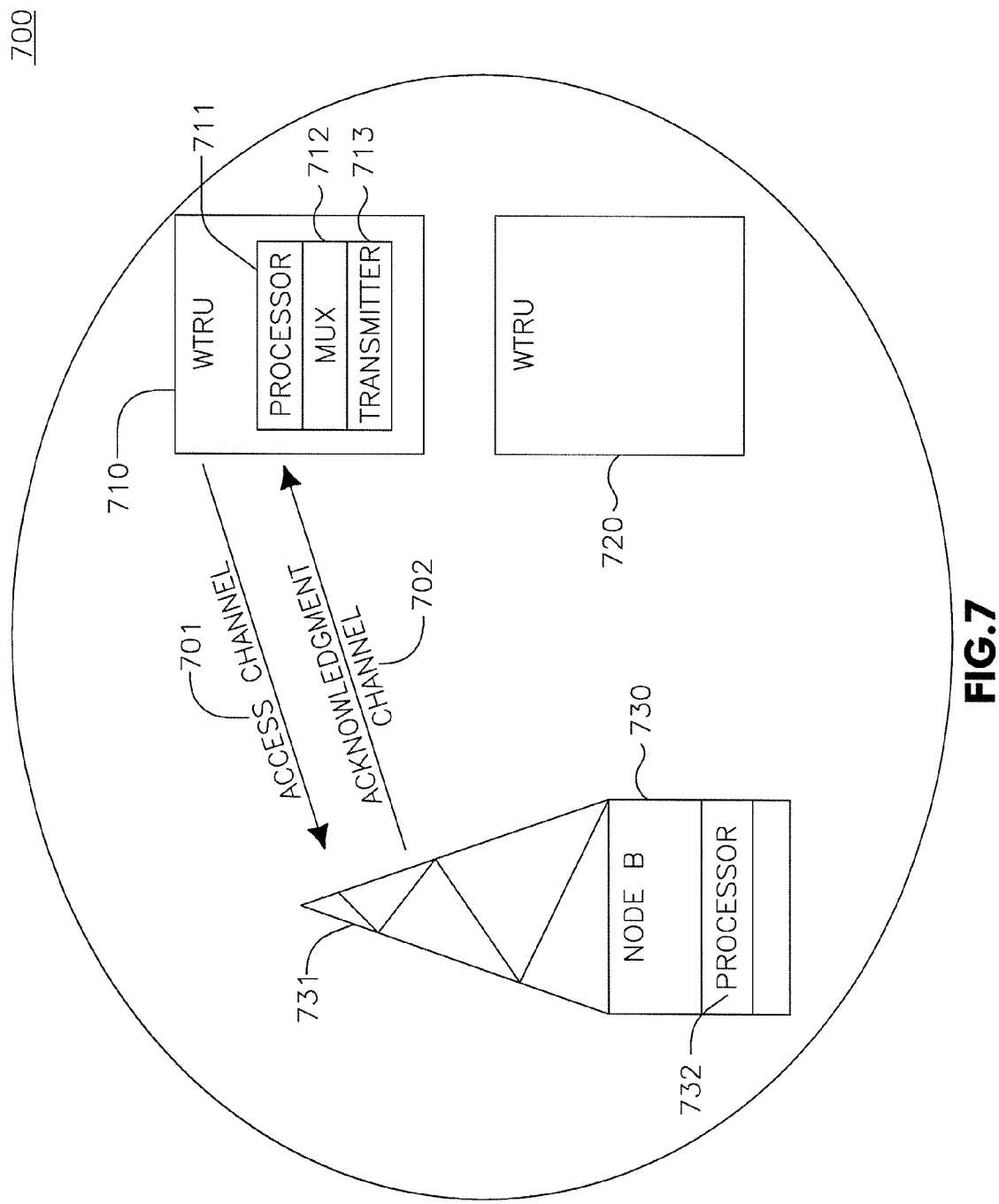
FIG. 7 shows a wireless communication system in accordance with the present invention.

FIG. 7 shows a wireless communication system 700 in accordance with the present invention. The system 700 comprises a Node B 730 in communication with at least one WTRU 710, 720 in a cell. A WTRU 710, 720 includes a processor 711, a multiplexer (MUX) 712, and a transmitter 713. FIG. 7 shows components of the WTRU 710 separately, but some components may be implemented by more or less components. The WTRU 710 sends an RACH transmission to the Node B 730 over an access channel 701, (i.e., an RACH), for an initial access. After detecting the RACH transmission from the WTRU 710, the Node B 730 returns an ACK over an ACK channel 702.

It may take several RACH transmissions before the Node B 730 detects the RACH transmission from the WTRU 710. The WTRU initially sets a transmit power level of the RACH transmission to a predetermined level and increases the transmit power level for the subsequent RACH transmissions. Alternatively, the WTRU may ramp up the transmit power level of the RACH transmission while transmitting the RACH transmission, which will be explained in detail hereinafter.

Figure 2:
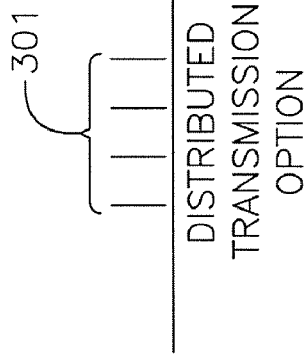
FIG. 2 shows sub-carrier mapping for an RACH in a localized transmission option.
Figure 3:
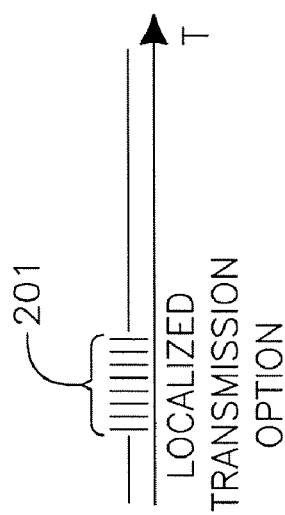
FIG. 3 shows sub-carrier mapping for an RACH in a distributed transmission option.

A set of subcarriers is assigned for an RACH. Subcarriers assigned for the RACH may be either "localized" or "distributed" in a frequency band. FIG. 2 shows a localized mapping where a block of consecutive subcarriers 201 are assigned for an RACH. FIG. 3 shows a distributed mapping where a plurality of distributed subcarriers 301 across the frequency band are assigned for an RACH.

The random access procedure includes sending a signature sequence and performing time and or frequency multiplexing RACH and data transmissions. A plurality of orthogonal signature sequences are defined and the WTRU 710 sends one of the signature sequences via an RACH.

The RACH transmissions include a transmit power ramp up in transmission of the signature sequence. As explained hereinbefore, since there is no code to detect, the ramp up can be faster. In a conventional OFDM system, no code search is performed. However, in accordance with the present invention, the RACH is searchable over subcarriers for the presence of a pattern.

Figure 4:
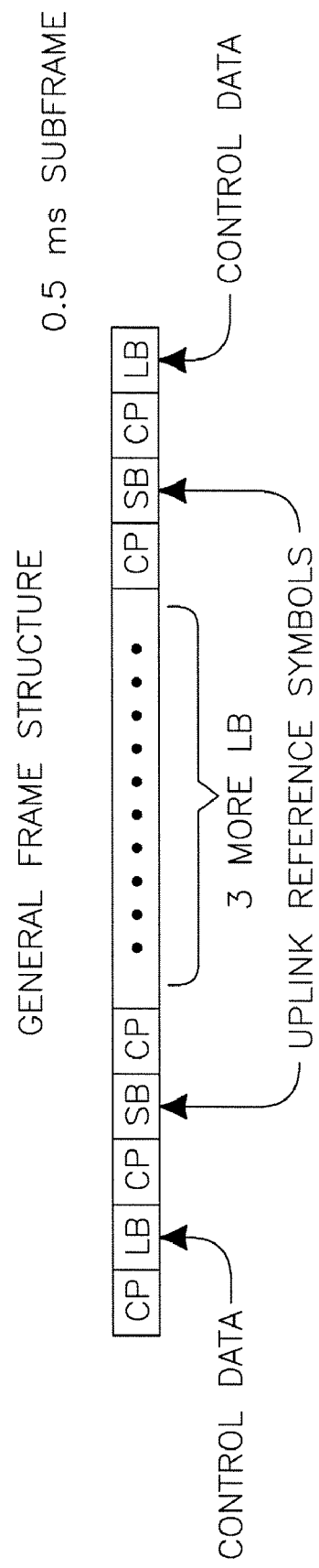
FIG. 4 shows a frame structure of a RACH in accordance with the present invention.

FIG. 4 shows an OFDM subframe structure for the RACH in accordance with the present invention. A 0.5 ms OFDM subframe includes a plurality of short blocks (SBs) and a plurality of long blocks (LBs). Each of the SBs and LBs are separated by a CP. The RACH includes control data included in a LB and/or uplink reference symbols included in an SB. The uplink reference symbols include both channel estimation and channel quality indication (CQI) measurements. The uplink reference symbols are orthogonal each other and are either: (1) multiplexed auto (different sets of sub-carriers); (2) time multiplexed; (3) code multiplexed (different shifts of a constant amplitude zero auto correlation (CAZAC) sequence).

Figure 5:
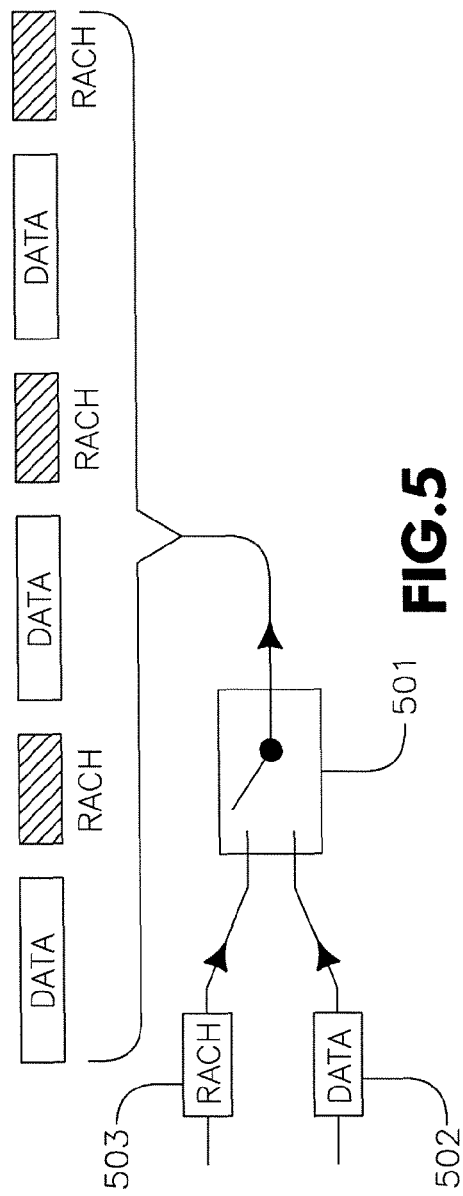
FIG. 5 shows multiple data frames with slots for RACH transmission in-between them.

In accordance with one embodiment of the present invention, RACH transmissions and data transmissions are time multiplexed. All terminals that are communicating have been time synchronized to the Node B. In a variation of the first embodiment, there is a slot for RACH transmission to happen between data frames, or multiple data frames as shown in FIG. 5. The multiplexing is accomplished either in software operating on a general purpose processor, or using dedicated logic circuit to perform the multiplexing. A dedicated logic circuit would simply include a switch 501 that switches between a data stream 502 and RACH information 503, taking a fixed number of bits/symbols from each one in order. An RACH access may occur during the random access slots. Alternatively, the RACH access may occur every few data frames.

Figure 6:
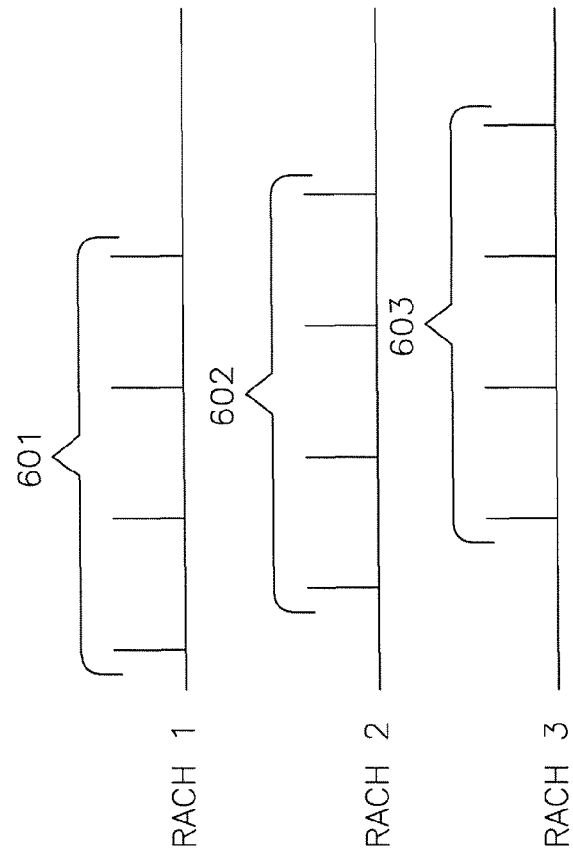
FIG. 6 shows multiple RACHs that are defined by different sets of sub-carriers.

Multiple RACHs may be defined as different sets of sub-carriers. FIG. 6 shows three (3) RACHs, (RACH1, RACH2, and RACH3), as an example, each with a unique set of sub-carriers. For RACH transmission, one of the defined RACHs may be chosen by a WTRU randomly, or may be assigned to a WTRU based on predetermined criteria. One way to assign a different RACH to a different user is using a serial number of a WTRU. Alternatively, any other criterion, (such as user ID), that is unique to each user may be used for the RACH assignment. As an example, if the slots are assigned based on the last digit of a user specific number, and if the numbers are random to begin with, users may be grouped into ten groups (one group for each slot 0, 1, 2, ..., 9).

On a downlink ACK channel, which is used to let a user know that a WTRU is recognized by a Node B after the WTRU makes an RACH transmission, the Node B may use a set of sub-carriers (i.e., a subchannel) associated with the RACH channel carrier assignments. This enables a user trying to access the Node B to see an ACK message intended for that user.

Additionally, each WTRU may select a random phase of a Constant Amplitude Zero Auto Correlation (CAZAC) sequence to further randomize and avoid collisions between accessing users. In such case, the total number of RACHs is increased by the following formula:

Total Number of RACH=$N_{subchannels} \times N_{CAZAC\text{-}Random\ phases}$.

Figure 8:
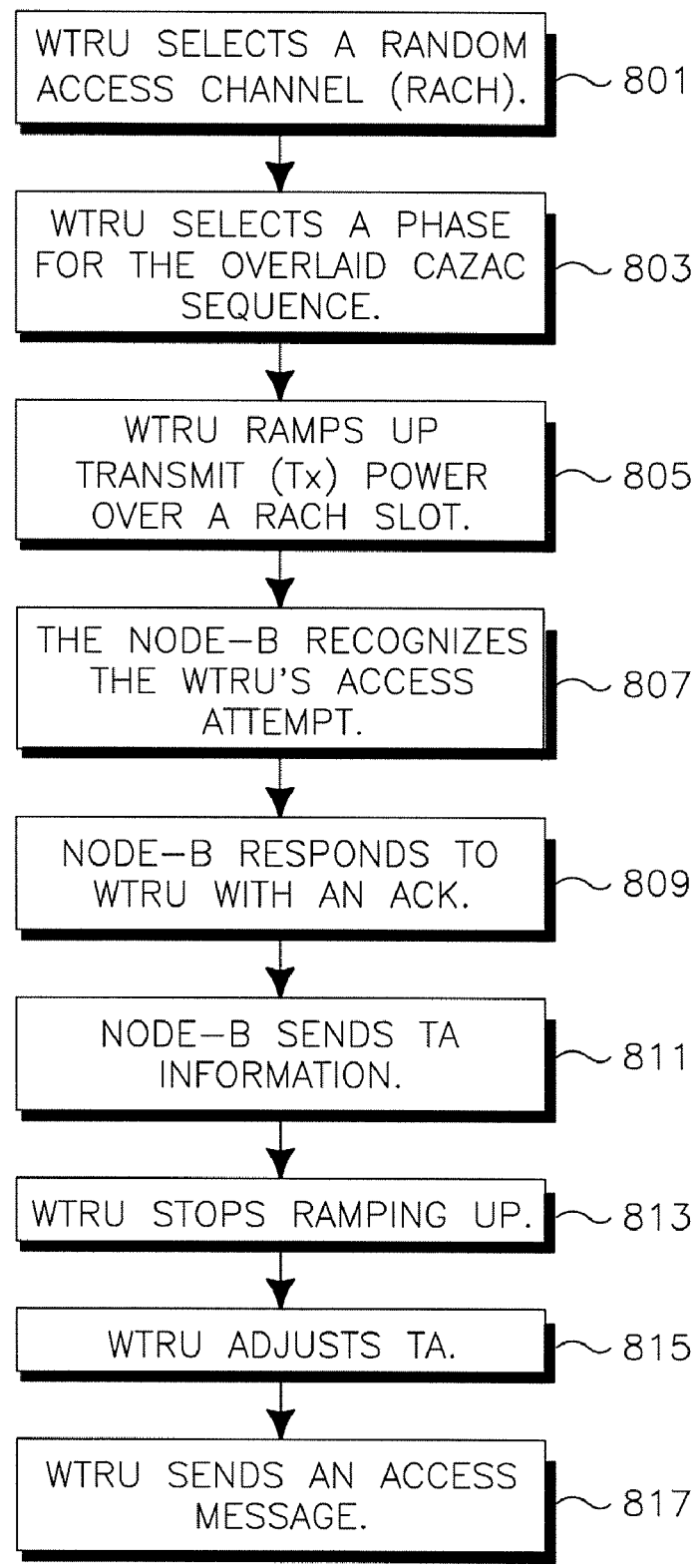
FIG. 8 is a flow diagram of a process of an access via an RACH in accordance with the present invention.
Figure 9:
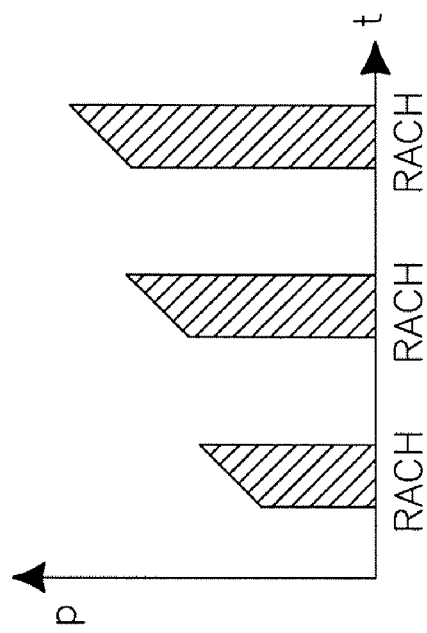
FIG. 9 shows a transmit power ramp up where the transmit power is increased in-between each RACH slot.
Figure 10:
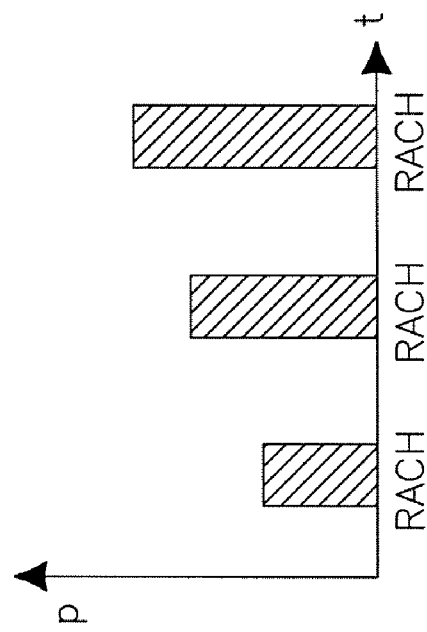
FIG. 10 shows a transmit power ramp up where the transmit power is increased during each RACH.

FIG. 8 is a flow diagram of a process of an access via an RACH in accordance with the present invention. A WTRU 710 selects an RACH among a plurality of pre-defined RACHs (step 801). The WTRU 710 preferably selects a phase for the overlaid CAZAC sequence (step 803). The WTRU 710 sets up a transmit (Tx) power for the RACH while making an RACH transmission (step 805). The RACH transmit power may be ramped up while the RACH transmission is being transmitted as shown in FIG. 9. Alternatively, the transmit power may be stepped up each subsequent RACH transmission as shown in FIG. 10. A Node B processor 732 recognizes the WTRU's attempt on the RACH (step 807). The Node B responds on an associated ACK channel (step 809). The Node B 730 also sends TA information to the WTRU (step 811). The WTRU 710 stops increasing the RACH transmit power once the WTRU 710 receives an ACK from the Node-B 730 (step 813). The WTRU 710 then adjusts TA (step 815) and sends an RACH message (step 817).

A Node B has to implement a detector that will search all RACHs during RACH intervals for WTRUs. The RACH slot must be larger than the trip delay from the Node B, and the slot must also have a CP at the end so as not to interfere with data frames. Associated ACK channels have to be paired with the RACH and CAZAC phase detected. Additional information may be coded on the phase of the RACH access.

Figure 11:
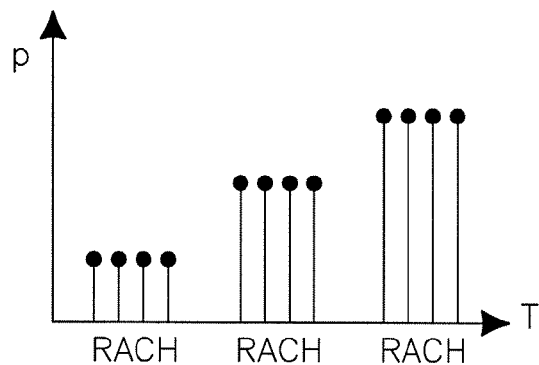
FIG. 11 shows a transmit power ramp up in a distributed channel.

FIG. 11 shows a signal response for the distributed transmission option which is essentially the same as the localized option. In the localized transmission, all subcarriers in the subcarrier block for the RACH are transmitted and the power of all of them is ramped up, or stepped up. In the distributed option shown in FIG. 11, the distributed subcarriers are transmitted and the power of those distributed subcarriers is ramped up, or stepped up. If the first RACH transmission is not successfully received by a Node B, the WTRU sends more than one RACH transmissions while increasing transmit power on the RACH as shown in FIGS. 9-11. Where the RACH access takes more than one RACH slot, the transmit power on the subsequent RACH slot may be the transmit power at the last RACH transmission, or it can be lower or higher than the previous one. The power ramp-up may initially start at a level that is low enough not to cause interference with other cells.

Figure 12:
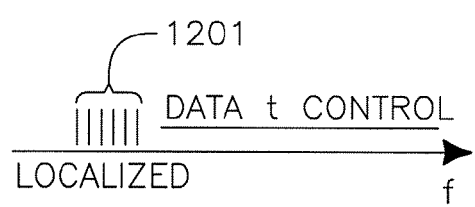
FIG. 12 shows an RACH for a localized mode of frequency multiplexing.
Figure 13:
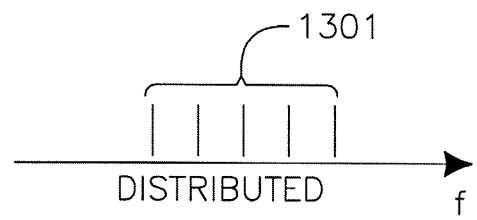
FIG. 13 shows an RACH for a distributed mode of frequency multiplexing.

In accordance with another embodiment of the present invention, some of the subcarriers are used for the RACH while others are used for data and/or control data (i.e., frequency multiplexing). The RACH subcarriers may be localized or distributed as shown in FIGS. 12 and 13. Since all WTRUs are synchronized to a Node B, the WTRUs know the timing and have carrier synchronization. The RACH frame may be a special frame and simply use the same frame structure as the data and control fields.

In this embodiment, power ramp-up operates essentially the same as the time multiplexed embodiment described hereinbefore. A WTRU synchronizes to the Node B and starts ramping up on the access channel. The RACH can have multiple channels with different subcarrier assignments or CAZAC sequences can form multiple RACH channels. Different phases of the CAZAC sequence can be used to increase the number of RACHs.

The Node-B detects the phase of the RACH sequence and the phase can be used to increase the number of RACHs. In other words, since the Node B is capable of detecting different phases of the CAZAC sequence, and CAZAC sequences with different phases are orthogonal to each other (therefore do not interfere with each other), multiple RACH attempts can be made by multiple WTRUs at the same time. This in effect increases the number of available RACHs.

It is important to note that both the time and frequency multiplexed embodiments described above can allow the Node B to transmit an ACK on a shared channel with an indication of the recognized RACH attempt, which is readable by all WTRUs.

There are several considerations that are specific to the MIMO application. Multiple MIMO options are possible including spatial multiplexing, space-frequency block coding (SFBC), space time block coding (STBC), beam forming, and other combinations of these options. When making an attempt to access a Node B, the WTRU should be detected quickly so that the WTRU does not ramp-up too high and cause interference to other WTRUs on the system. Therefore, the WTRU makes the RACH attempt using the MIMO scheme with the highest redundancy among the ones possible. Here, the MIMO scheme with the highest redundancy refers to the MIMO scheme that includes the highest level of diversity gain and therefore is most robust to different channel conditions. Diversity MIMO techniques, (such as STBC or SFBC), take advantage of the diversity gain and enable signaling that is resistant to fading and other channel impairments.

Different MIMO options that may be considered in accordance with the present invention are as follows:

The first option is called a basic STBC option, in which the WTRU makes an RACH access attempt using an open loop STBC. Using an open loop STBC has an advantage that the signal benefits from diversity gain without requiring expensive receivers at the Node B.

The second option is called a dominant mode option, in which the WTRU has downlink channel estimation and may formulate the eigen modes of the channels. The WTRU determines the best mode of the channel by analyzing the signal from the Node B and use the same mode to transmit back. This has an advantage that an effective best beam forming solution is implemented that would increase signal quality at the Node B and make detection performance higher.

Another option is an optimum precoding option. When precoding beam forming is available, the WTRU may select the best precoding option to make an RACH attempt. If a codebook approach is used, the WTRU chooses the precoder that is either most robust for maximum diversity, or has the highest gain. Optimum precoding option is similar to the dominant mode option in that the WTRU applies a precoding matrix to the transmit signal where the precoding matrix is selected from a codebook, and such that the precoding matrix is best suited for the prevailing channel conditions.

After a successful RACH attempt, adaptive modulation coding (AMC) and link adaptation may start. Which option is implemented depends on the channel conditions, the cell type (i.e. hotspot, macro cell, micro cell, etc), and the capabilities of the WTRU.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
a processing device and an associated transmitting device configured to access a wireless communication system by selecting a phase of a constant amplitude zero autocorrelation (CAZAC) sequence out of a set of phases of the CAZAC sequence, combining the selected phase of the CAZAC sequence with a cyclic prefix and transmitting the combined selected phase of the CAZAC sequence and the cyclic prefix over a random access channel (RACH);
the processing device and the associated transmitting device, on a condition that the WTRU does not receive an indication over a shared channel that the selected phase of the CAZAC sequence was received, are further configured to transmit another phase of the CAZAC sequence combined with another cyclic prefix over the RACH at an increased transmission power level; and
the processing device and the associated transmitting device, on a condition that the WTRU does receive an indication over the shared channel that the selected phase of the CAZAC sequence was received, are further configured to transmit a signal including access message data and reference symbols with a transmission timing adjusted in response to a timing advance received with the indication; wherein the reference symbols are derived from a CAZAC sequence.

2. The WTRU of claim 1 wherein the indication indicates which phase of the CAZAC sequence was received.

3. The WTRU of claim 1 wherein the processing device and the associated transmitting device are further configured to process the selected phase of the CAZAC sequence using a discrete Fourier transform (DFT) followed by an inverse fast Fourier transform.

4. The WTRU of claim 1 wherein the transmitted combined selected phase of the CAZAC sequence and the cyclic prefix is transmitted over a plurality of sub-carriers.

5. The WTRU of claim 1 wherein the wireless communication system uses orthogonal frequency division multiplexing (OFDM).

6. The WTRU of claim 1 wherein the wireless communication system uses orthogonal frequency division multiplexing (OFDM) multiple input multiple output (MIMO).

7. The WTRU of claim 1 wherein the transmission of the combined selected phase of the CAZAC sequence and the cyclic prefix occurs in a slot.

8. The WTRU of claim 1 wherein the the phase of the CAZAC sequence is selected based on information that the WTRU desires to convey to the wireless communication system.

9. The WTRU of claim 1 wherein the processing device and the associated transmitting device are configured to select the phase of the CAZAC sequence in a random manner.

10. The WTRU of claim 1 wherein the WTRU is assigned the selected phase of the CAZAC sequence.

11. The WTRU of claim 1 wherein the processing device and the associated transmitting device are configured such that the selected phase of the CAZAC sequence is selected in a random manner and the selected phase of the CAZAC sequence is assigned.

12. The WTRU of claim 1 wherein the processing device is further configured to receive RACH assignment information indicating subchannels to be used to transmit the combined selected phase of the CAZAC sequence and the cyclic prefix; wherein the transmitted combined selected phase of the CAZAC sequence and the cyclic prefix is frequency multiplexed with data or control signals from other WTRUs.

13. The WTRU of claim 1 wherein the processing device is configured to process the access message by discrete Fourier transforming (DFT) the access message, mapping a result of the DFT to subcarriers and inverse Fourier transforming the mapped subcarriers.

14. The WTRU of claim 13 wherein the processing device is configured to process the selected phase of the CAZAC sequence by discrete Fourier transforming (DFT) the access message, mapping a result of the DFT to subcarriers and inverse Fourier transforming the mapped subcarriers.

15. A method for use in a wireless transmit/receive unit (WTRU), the method comprising:
    accessing a wireless communication system by selecting a phase of a constant amplitude zero autocorrelation (CAZAC) sequence out of a set of phases of the CAZAC sequence;
    combining the selected phase of the CAZAC sequence with a cyclic prefix;
    transmitting the combined selected phase of the CAZAC sequence and the cyclic prefix over a random access channel (RACH);
    on a condition that the WTRU does not receive an indication over a shared channel that the selected phase of the CAZAC sequence was received, transmitting another phase of the CAZAC sequence combined with another cyclic prefix over the RACH at an increased transmission power level; and
    on a condition that the WTRU does receive an indication over the shared channel that the selected phase of the CAZAC sequence was received, transmitting a signal including access message data and reference symbols with a transmission timing adjusted in response to a timing advance received with the indication; wherein the reference symbols are derived from a CAZAC sequence.

16. The method of claim 15 wherein the indication indicates which phase of the CAZAC sequence was received.

17. The method of claim 15 further comprising:
    processing the selected phase of the CAZAC sequence using a discrete Fourier transform (DFT) followed by an inverse fast Fourier transform.

18. The method of claim 15 wherein the transmitting the combined selected phase of the CAZAC sequence and the cyclic prefix is over a plurality of sub-carriers.

19. The method of claim 15 wherein the wireless communication system uses orthogonal frequency division multiplexing (OFDM).

20. The method of claim 15 wherein the wireless communication system uses orthogonal frequency division multiplexing (OFDM) multiple input multiple output (MIMO).

21. The method of claim 15 wherein the transmission of the combined selected phase of the CAZAC sequence and the cyclic prefix occurs in a slot.

22. The method of claim 15 wherein the phase of the CAZAC sequence is selected based on information that the WTRU desires to convey to the wireless communication system.

23. The method of claim 15 wherein the phase of the CAZAC sequence is selected in a random manner.

24. The method of claim 15 wherein the WTRU is assigned the selected phase of the CAZAC sequence.

25. The method of claim 15 wherein the selected phase of the CAZAC sequence is selected in a random manner and the selected phase of the CAZAC sequence is assigned.

26. The method of claim 15 further comprising receiving RACH assignment information indicating subchannels to be used to transmit the combined selected phase of the CAZAC sequence and the cyclic prefix; wherein the transmitted combined selected phase of the CAZAC sequence and the cyclic prefix is frequency multiplexed with data or control signals from other WTRUs.

27. The method of claim 15 further comprising processing the access message by discrete Fourier transforming (DFT) the access message, mapping a result of the DFT to subcarriers and inverse Fourier transforming the mapped subcarriers.

28. The method of claim 27 further comprising processing the selected phase of the CAZAC sequence by discrete Fourier transforming (DFT) the access message, mapping a result of the DFT to subcarriers and inverse Fourier transforming the mapped subcarriers.

* * * * *